(12) United States Patent
Birchmeier

(10) Patent No.: US 9,945,112 B2
(45) Date of Patent: Apr. 17, 2018

(54) VALVE FOR USE IN A SEWAGE LINE

(71) Applicant: Raymon T. Birchmeier, New Lothrop, MI (US)

(72) Inventor: Raymon T. Birchmeier, New Lothrop, MI (US)

( * ) Notice: Subject to any disclaimer, the term of this patent is extended or adjusted under 35 U.S.C. 154(b) by 0 days.

(21) Appl. No.: 15/350,484

(22) Filed: Nov. 14, 2016

(65) Prior Publication Data

US 2017/0138037 A1 May 18, 2017

Related U.S. Application Data

(60) Provisional application No. 62/254,288, filed on Nov. 12, 2015.

(51) Int. Cl.

| *E03F 7/04* | (2006.01) |
| *F16K 15/18* | (2006.01) |
| *F16K 27/06* | (2006.01) |
| *F16K 31/60* | (2006.01) |
| *F16K 5/04* | (2006.01) |

(52) U.S. Cl.
CPC .............. *E03F 7/04* (2013.01); *F16K 5/0414* (2013.01); *F16K 5/0407* (2013.01); *F16K 15/188* (2013.01); *F16K 27/065* (2013.01); *F16K 31/602* (2013.01); *Y10T 137/6058* (2015.04)

(58) Field of Classification Search
CPC ...... E03F 7/104; F16K 5/0414; F16K 5/0407; F16K 31/602; F16K 15/188; F16K 27/065; Y10T 137/6058
See application file for complete search history.

(56) References Cited

U.S. PATENT DOCUMENTS

| 3,135,293 | A | * | 6/1964 | Hulsey | F16K 5/0421 137/625.3 |
| 3,443,793 | A | * | 5/1969 | Hulsey | F16K 5/0407 251/209 |
| 3,509,909 | A | * | 5/1970 | Frazer | F16K 5/04 137/565.23 |
| 3,913,886 | A | * | 10/1975 | Di Cicco | F16K 5/0407 251/215 |
| 4,637,425 | A | | 1/1987 | Petersen | |

(Continued)

*Primary Examiner* — Craig Schneider
*Assistant Examiner* — Kevin Barss
(74) *Attorney, Agent, or Firm* — The Weintraub Group, P.L.C.

(57) ABSTRACT

In a first embodiment, the present invention is a valve insertable into a sewage line in order to prevent backflow into a structure. The valve includes a mouth formed therein which corresponds to the size of an inlet of the sewage line and means for rotating for rotating the valve within the sewage line. Rotation of the valve to an open position aligns the mouth with the inlet of the sewage line to permit flow through the sewage line and rotation of the valve body to a closed position rotates the mouth away from the inlet of the sewage line to prevent flow through the sewage line. In a second embodiment, the present invention further includes a conduit adapter that replaces a converging section of the sewage line in order to retrofit the valve into a sewage line where the valve would otherwise not fit therein. Additionally, in either the first or second embodiment, the present invention provides for the simultaneous purging of the sewage line by attaching means for purging to the valve.

20 Claims, 5 Drawing Sheets

(56) References Cited

U.S. PATENT DOCUMENTS

| | | |
|---|---|---|
| 4,887,792 A | 12/1989 | Kuo |
| 5,123,018 A | 6/1992 | Peterson |
| 6,125,878 A | 10/2000 | Watts |
| 6,311,721 B1 | 11/2001 | Aaron |
| 7,225,834 B2 | 6/2007 | Hampton |
| 8,028,715 B2 | 10/2011 | Shimizu et al. |
| 2013/0284278 A1* | 10/2013 | Winborn ................. F16L 15/00 137/15.01 |

* cited by examiner

VALVE FOR USE IN A SEWAGE LINE

CROSS-REFERENCE TO RELATED APPLICATION

This application is a completion application which claims the priority benefit of U.S. Provisional Patent Application Ser. No. 62/254,288, filed Nov. 12, 2015, for "Valve for Purging Sewage Line," the entire disclosure of which is hereby incorporated by reference in its entirety, including the drawing.

BACKGROUND OF THE INVENTION

1. Field of the Invention

The present invention pertains to an in-line valve for preventing sewage backflow within a sewage line. More particularly, the present invention pertains to a manually operated in-line valve for preventing backflow within a sewage line. Even more particularly, the present invention provides an in-line valve for preventing backflow while simultaneously purging a sewage line.

2. Description of Related Art

Conventionally, sewage and waste fluids are transported from a residential or commercial structure by way of either a septic line or a sewage line. A septic line transports waste from a structure, into a septic tank, and, thereafter, into a septic field. Alternatively, a sewage line deposits the waste into a city's sewer network.

In a septic tank system, the septic tank holds waste from the structure until the solid debris settles at the bottom of the tank and the lighter waste floats to the top of the tank. Between the two layers of solid debris and lighter waste is a clarified liquid that exits the septic tank through an outlet pipe and is slowly released into a drain field. Beneficial bacteria within the septic tank naturally breaks down the heavier material allowing it to exit the septic tank.

Over time and with excessive use, the bacteria may get flushed out of the septic tank which can cause the sewage to build up and block the outlet pipe, possibly clogging the septic field. When this happens, a backup can occur causing the flow of waste from the septic tank or septic line to reverse and backup into the structure.

Such an occurrence of waste backflow into a structure often results in significant property damage and may additionally pose a serious health hazard to humans. Consequently, devices have been designed to ensure the flow of waste is directed away from the structure and prevent the flow of waste within the septic line from reversing in the opposite direction in the case of a backup.

With regards to a typical sewer network, a sewer main is located beneath a ground surface deeper than the sewage effluent lines of the structures that feed it. Where the ground surface topography makes this impossible, a lift station or the equivalent must be added within the network to generate a flow-inducing hydraulic gradient. Once the waste fluid enters the sewer network, the waste fluid is transported through increasingly larger sewer mains to an outflow location, typically a wastewater treatment facility.

The necessity of open lines in a gravity-driven flow network creates the possibility of sewage backflow as well. Under certain conditions, the sewage flow direction can be reversed, thus causing sewage to flow from the sewer main back into the original structures the sewage exited from and the deposition of sewage and waste fluids within the lower levels of residential homes and commercial buildings. This backflow of waste results in the same significant property damage and health concerns as exhibited above.

An additional difficulty faced in maintaining the operability of septic lines or sewage lines is the purging of the line when an obstruction of debris or waste material is formed within the line preventing the flow of waste or water from exiting the structure and being emptied into a septic tank or sewer main.

Traditional methods of purging sewage lines involve the user unscrewing a cleanout cap which, oftentimes, immediately results in waste spewing out from the sewage line, thereby contaminating the user. Upon removing the cleanout cap, the user then attempts to clear the blockage by feeding a sewer snake or auger into the sewage line in the direction of the supposed blockage. This process of snaking out a sewage line is a time consuming, exhausting, and filthy process.

One common solution to the problems addressed above involves the installation of a one-way valve within the structure sewage line. An example is shown in U.S. Pat. No. 5,234,018, issued Aug. 10, 1993, which discloses an in-line sewer check valve and cleanout apparatus. The device disclosed therein uses a pivotally attached flapper that remains in an upright position as the outflow of sewage pushes the back side of the flapper open. As the direction of the sewage flow reverses, the sewage pushes against the front side of the flapper forcing it to close and rest against a valve seat, effectively sealing off the sewage line. The flapper remains in the closed position until the flow of sewage reverses once again to its correct direction and the flow pushes the flapper open from the rear. Unfortunately, this type of device can often become clogged as it is required that the flapper sit airtight against the seat within the sewage line. Therefore, it is quite possible that sewage can clog the flapper, preventing it from becoming airtight, and, thus, allow debris to flow in the reverse direction through the sewage line. Furthermore, this type of device cannot be manually operated as it only operates in connection with the flow of sewage and when force is applied to the flapper.

U.S. Pat. No. 8,028,715, issued Oct. 4, 2011, discloses an in-line check valve for preventing sewage backflow while allowing the flap to be manually operated by an above ground rod. The rod can be used to close the flap in anticipation of the flow reversing. Despite being manually operated, the device still faces the obstacle of potentially becoming clogged with larger pieces of debris and not creating an airtight seal within the sewage line.

Another solution is disclosed in U.S. Pat. No. 4,637,425, issued Jan. 20, 1987, which teaches a manually operated check valve that prevents debris from clogging the check valve. The valve permits manual operation of the valve and also acts automatically in response to rising sewage levels within a sewage line. A seal in the device has a knife edge which presses against a flapper in order to cut through larger pieces of debris. By doing so, the debris is broken down and the flapper is better able to sit flat against the seal to create an airtight closure. While the knife edge of the seal may assist in breaking down larger pieces of debris, it requires that the flapper compress against the seal with a great amount of force to cut through the debris.

While the references cited above seek to prevent the backflow of sewage into a structure, the references fail to also address a device that facilitates simultaneously purging of the sewage line while preventing backflow to ensure there is an open channel for waste to exit the structure.

Thus, there is a need for a manually operated device which can create an airtight seal within a septic or sewage line to prevent backflow of waste into a structure while simultaneously providing means for enabling purging of the line of any debris clogged therein.

It is to this to which the present invention is directed.

The above references are identified herein in recognition of a duty of disclosure of known related subject matter, which may be relevant under 37 C.F.R. 1.56, and specifically incorporated herein by reference as regards to the conventional approaches and constructions taught therein.

SUMMARY OF THE INVENTION

The present invention provides, in a first embodiment, a rotatable valve for manually closing off a channel within a sewage line and, in a second embodiment, a valve assembly for closing off a channel within a sewage line.

In the first embodiment hereof, the valve comprises: (a) a rotatable valve body insertable into a clean out port of a sewage line, the valve body including a cylindrical wall having an at least substantially closed first end and an open second end, the wall defining an open interior within the valve body; (b) a mouth formed in the wall of the valve body providing an opening into the interior of the valve body, the mouth corresponding substantially to the size of an inlet of the sewage line; (c) means for rotating for rotating the valve body between an open and a closed position; and wherein the mouth of the valve body aligns with the inlet of the sewage line when in the open position and, when in the closed position, the mouth of the valve body does not align with the inlet of the sewage line.

Either the valve or the sewage line is dimensioned to allow the valve body to securably fit within the sewage line without any substantial structural modifications to the sewage line.

In the second embodiment hereof, the valve assembly comprises: (a) a valve including: (1) a rotatable valve body including a cylindrical wall having an at least substantially closed first end and an open second end, the wall defining an open interior within the valve body; (2) a mouth formed in the wall of the valve body providing an opening into the interior of the valve body; (b) a substantially Y-shaped conduit adapter for securing the valve to a sewage line, the conduit adapter including: (1) a cylindrical adapter body having an open first end and an open second end, the second end being securable to an end of the sewage line, the adapter body defining an open interior, the adapter body including an inlet formed within the adapter body corresponding to the size of the mouth in the valve; (2) an inlet adapter extending outwardly from the inlet formed in the adapter body, the inlet adapter being securable to an end of an inlet line of a structure; (c) means for rotating for rotating the valve body between an open and a closed position; and wherein the valve is slidably insertable into the first end of the conduit adapter; and further wherein the mouth of the valve body aligns with the inlet of the conduit adapter when in the open position and, when in the closed position, the mouth of the valve body does not align with the inlet of the conduit adapter.

Here, the conduit adapter replaces a small section of an existing sewage line in order to facilitate the valve being securable to the sewage line which would not be able to accommodate the valve otherwise.

In both the first and second embodiments of the present invention, the valve may further include an optional hollow shaft extending from the first end of the valve body and in fluid communication therewith to facilitate the attachment of means for purging the sewage line.

For a better understanding of the present invention, reference is made to the accompanying drawing and detailed description. In the drawing, like reference numerals refer to like parts through the several views, in which:

DETAILED DESCRIPTION OF THE INVENTION

Throughout the ensuing description, it should be understood that all reference to a sewage line includes septic lines and other waste transportation lines that could accommodate the valve 10 of the present invention.

Figure 1:
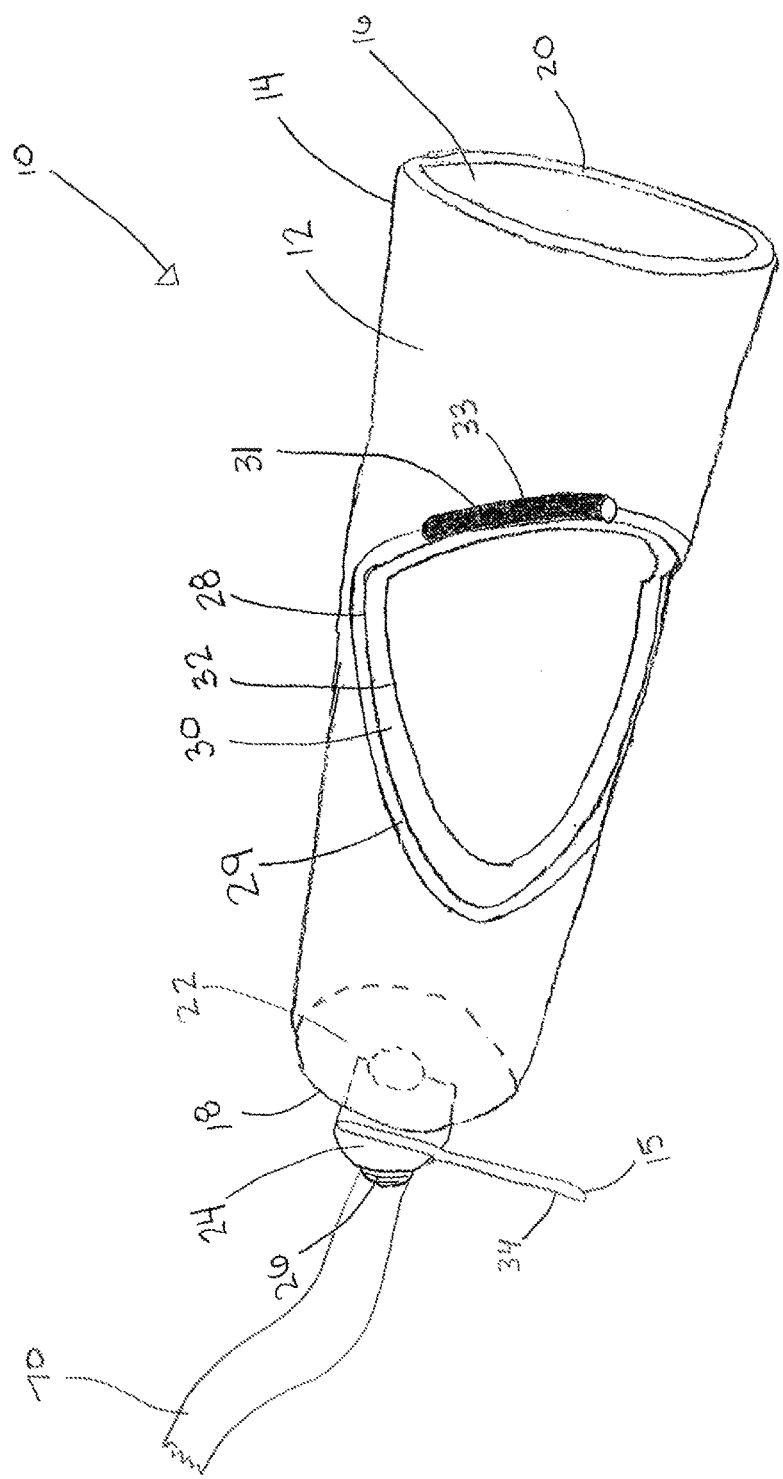
FIG. 1 is a perspective view of a valve in accordance with a first embodiment of the present invention.
Figure 2:
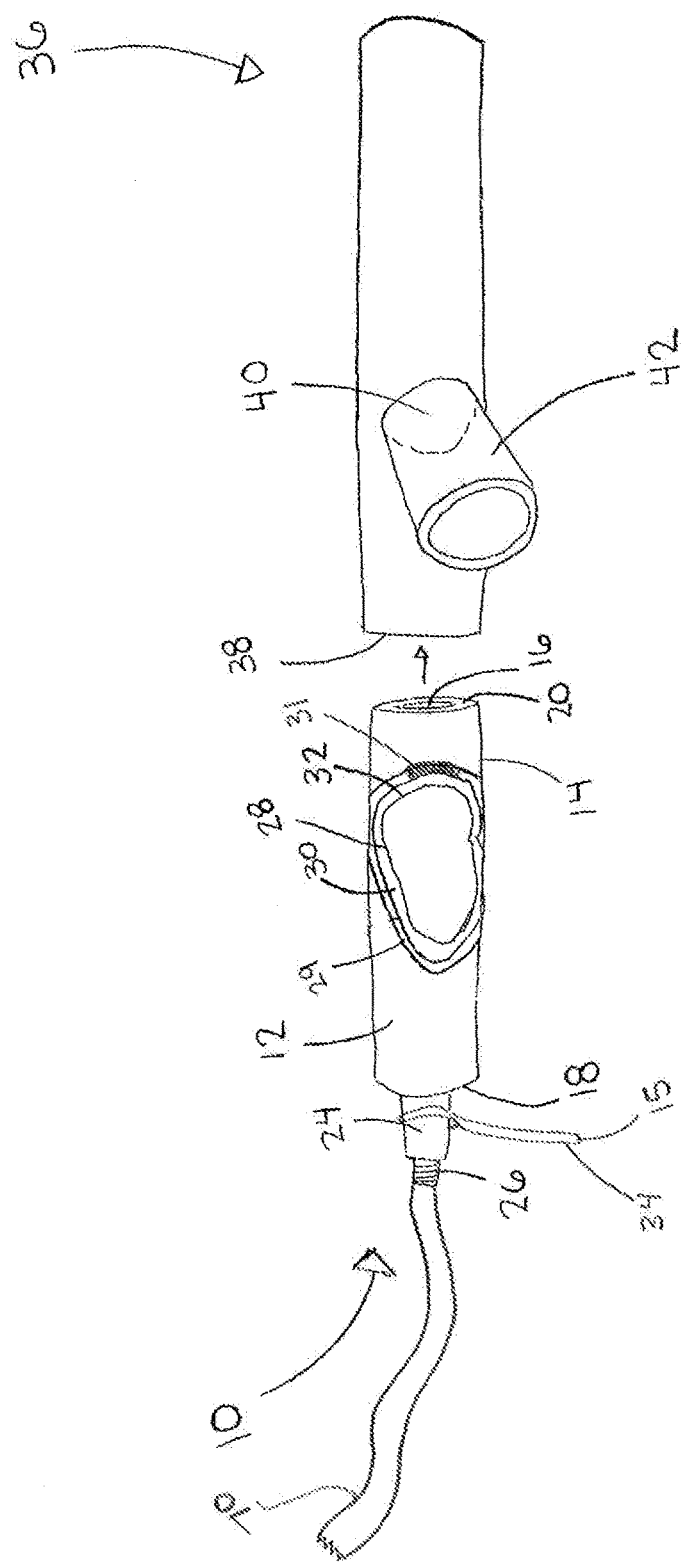
FIG. 2 is a partial exploded view of the valve thereof in use with a sewage line.

Now, and in accordance with a first embodiment of the present invention and with reference to FIGS. 1 and 2 of the drawing, there is provided a valve, generally, denoted at 10, for use in a sewage line 36, the valve 10 comprising: (a) a valve body 12 including a cylindrical wall 14 defining a hollow interior 16 therein; (b) a mouth 28 formed in the wall 14 of the valve body 12; and (c) means for rotating 15 for rotating the valve body 12.

The wall 14 of the valve body 12 further includes a first end 18 at least substantially closed by a planar end wall 22 to prevent backflow out of the first end 18 of the valve 10 and an open second end 20.

The mouth 28 comprises a tapered edge 30 angled inwardly toward the interior 16 of the valve body 12. The edge 30 of the mouth 28 terminates at a sharpened lip 32. The lip 32 is, preferably, sharp enough to easily cut through larger pieces of waste when the valve 10 is rotated within the sewage line 36, as described below.

The valve 10 further comprises a groove 29 circumferentially formed in the wall 14 proximate the mouth 28. Means for sealing 31, such as an O-ring, foam injection, silicone, or the like, is disposed within the groove 29 for creating an airtight seal between the valve body 12 and the sewage line 36. Preferably, an O-ring 33 (partially shown) formed of rubber, nitrile, neoprene, fluorocarbon, or the like is disposed within the groove 29. The O-ring 33 is either removably or fixedly securable within the groove 29. To fixedly secure the O-ring 33 within the groove 29, the O-ring 33 is secured using any suitable adhesive such as rubber cement, adhesive spray, or the like.

As noted above, the valve 10 further comprises means for rotating 15 for rotating the valve body 12 between an "open" position and a "closed" position. To facilitate the rotation of the valve body 10 between the open and closed positions, the means for rotating 15 comprises an elongated valve handle 34, such as a wrench frictionally enveloping a portion of the valve body 10, a lever, a rod, or the like. Although, the valve handle 34 is shown as being secured to a shaft 24, as described below, it is to be understood that the valve handle 34 may be either removably or fixedly secured to the valve 10 or valve body 12 itself. Where the valve handle 34 is fixedly secured to the valve body 12 itself, the valve handle 34 is, preferably, attached by being welded, soldered, or otherwise permanently secured to the valve body 12 proximate the first end 18. By using the valve handle 34, a user can rotate the valve body 12 into a desired position.

As shown in FIG. 2, the valve 10 fits within either an existing or custom manufactured sewage line 36 of a structure (not shown), such as a house or other suitable building, at a converging point located downstream each of the structure's interior sewage lines which leads to either a sewer main (not shown) or septic tank (not shown).

The sewage line 36 comprises a hollow, cylindrical member having a clean out port 38, used to access the interior of the sewage line 36 for cleaning or purging purposes. The sewage line 36 further comprises an inlet 40 located at a point where an inlet line 42, extending from the interior plumbing of the structure, intersects the sewage line 36. The inlet 40 provides an opening for the structure's waste to enter the sewage line 36 from the inlet line 42 and be transported to a remote location such as a sewer main or septic tank.

In order to install the valve 10 within the sewage line 36, the second end 20 of the valve wall 14 is inserted into the clean out port 38 of the sewage line 36. The valve 10 is inserted into the sewage line 36 until the mouth 28 of the valve 10 aligns and is in registry with the inlet 40 of the sewage line 36.

When the valve handle 34 is rotated approximately 90 degrees to the open position, the mouth 28 of the valve 10 is aligned with the inlet 40 of the sewage line 36 allowing waste to flow from the inlet line 42 of the structure to the valve 10 and continue to flow through the sewage line 36.

When the valve handle 34 is rotated to the closed position, the valve 10 is rotated, thereby rotating the mouth 28 away from the inlet 40. Thereafter, the valve wall 14 closes the inlet 40 off from the interior 16 of the valve body 12, thus obstructing access between the sewage line 36 and inlet line 42.

When a backup or reverse flow of waste is identified or anticipated, the valve handle 34 is rotated to rotate the valve body 12 within the sewage line 36 to close off the inlet 40 to prevent the waste from the sewer main or septic tank from re-entering the structure.

It is critical that the valve 10 fits within the sewage line 36 appropriately to ensure there is no gap between the mouth 28 and the inlet 40. Any gap would allow waste to enter the sewage line 36 through the inlet 40 even where the valve body 12 is rotated and in the closed position. Therefore, it is necessary that the diameter of the valve body 12 be only slightly smaller than the diameter of the sewage line 36 such that the O-ring 33 protrudes slightly above the groove 29 formed in the wall 14 to create a seal between the wall 14 and the sewage line 36 as described above.

While the present invention is extremely useful for manually closing off the sewage line 36 and preventing backflow of waste into a structure, the present invention may also provide the user with the ability to simultaneously purge the sewage line 36 of any clogs when the valve 10 is in the closed position.

As noted above, the valve 10 optionally, but preferably, further comprises an elongated shaft 24 disposed on the end wall 22 of the valve body 12 and extending outwardly therefrom. The shaft 24 includes a hollow interior which is in fluid communication with the interior 16 of the valve body 12.

The shaft 24 includes a threaded nub 26 disposed on an end of the shaft 24 opposite the valve body 12. The nub 26 has a hollow interior in fluid communication with the interior of the shaft 24 and, thus, is in fluid communication with the interior 16 of the valve body 12 as well. The threading on the nub 26 facilitates means for purging 70, such as a water hose, air hose, or the like which introduces a pressurized fluid within a confined space, to be securable thereto. It is to be understood that other suitable means for connecting the means for purging 70 to the nub 26 may be utilized such as clips, matingly lockable components, or the like.

In use, the means for purging 70 is secured to the free end of the nub 26 opposite the shaft 24 in order to purge a blockage within the sewage line 36.

Figure 3:
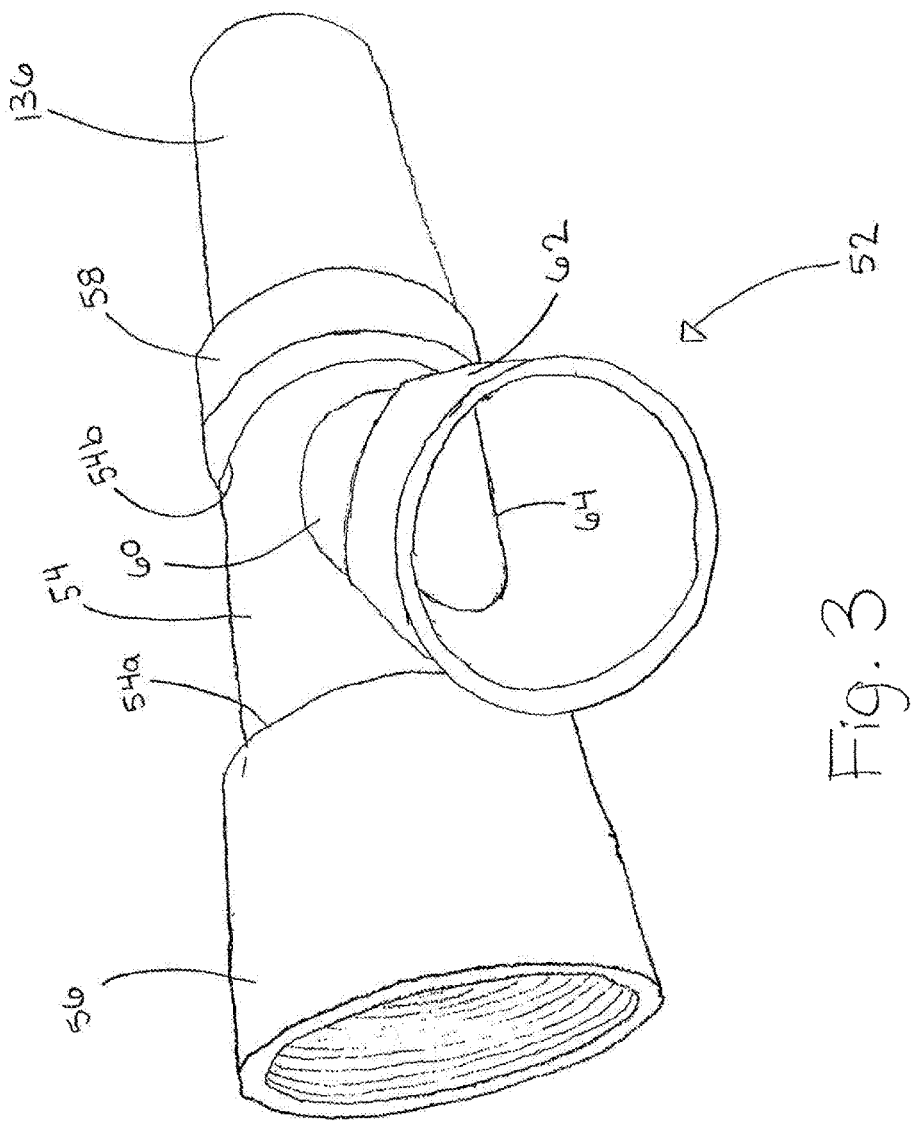
FIG. 3 is a perspective view of a conduit adapter in accordance with a second embodiment of the present invention.
Figure 4:
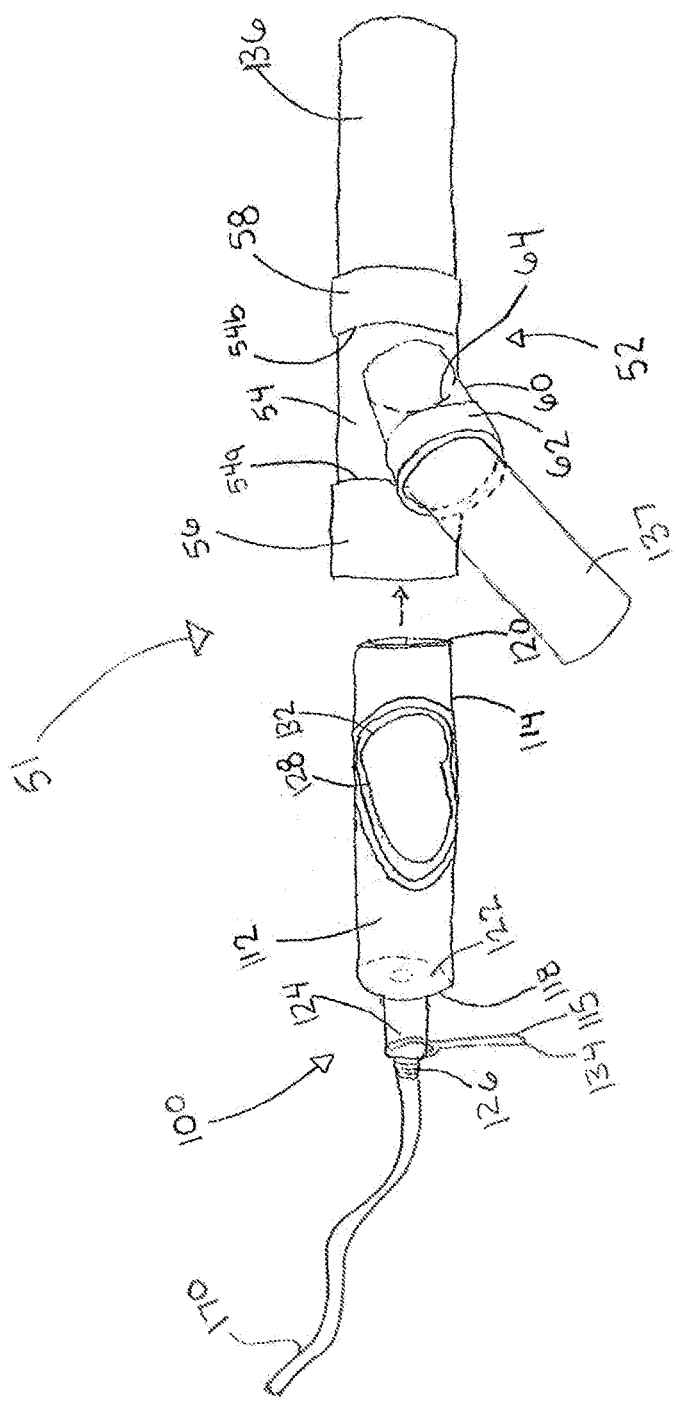
FIG. 4 is a partial exploded view of the valve of the second embodiment used in combination with the conduit adapter.
Figure 5:
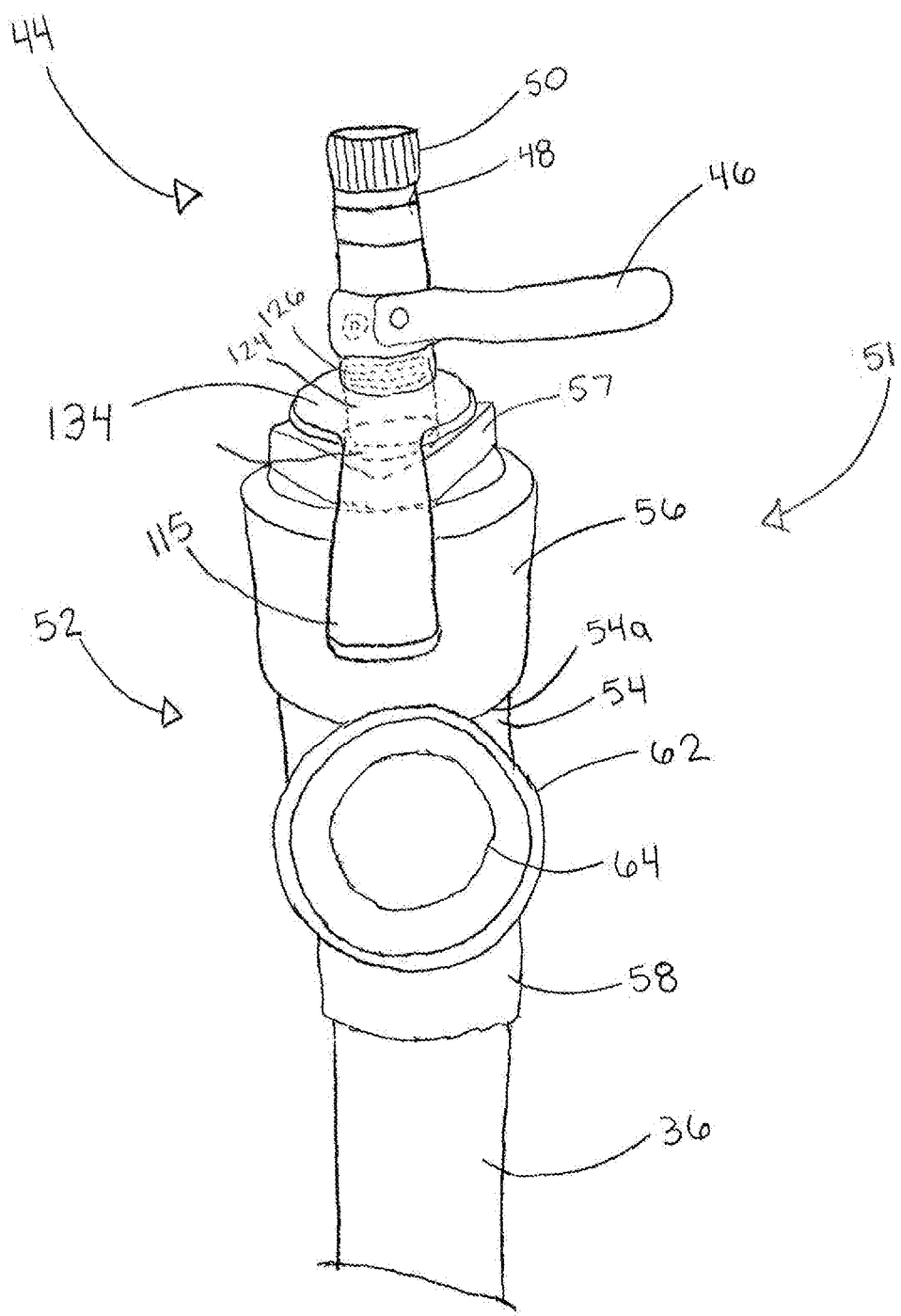
FIG. 5 is a front view of the valve thereof used in combination with the conduit adapter and a secondary valve.

Now, and in accordance with a second embodiment of the present invention and with reference to FIGS. 3-5 of the drawing, there is provided a valve assembly, generally, denoted at 51 comprising: (a) a valve 100; and (b) a conduit adapter 52 to facilitate retrofitting the valve 100 onto a sewage line 136.

The valve 100 is substantially the same in structure as the valve 10 described above. The valve 100, therefore, comprises a valve body 112 including a valve wall 114, the valve wall 114 including a first end 118, substantially closed by an end wall 122, and a second end 120. A mouth 128 including a sharp lip 132 is formed within the valve wall 114. The valve 100 further comprises an optional shaft 124 extending outwardly from the end wall 122 of the valve wall 114 and a threaded nub 126 disposed on an end of the shaft 124 opposite that of the valve body 112. Means for rotating 115 for rotating the valve body 112 is secured to the valve 100 as described below.

If the valve 100 does not fit within the existing sewage line 136 or the sewage line 136 is too large for the valve 100 such that it does not sufficiently conceal an inlet in the sewage line 136, the valve 100 may be retrofitted onto the sewage line 136 by replacing a small converging section of the sewage line 136 with the conduit adapter 52.

As shown in FIG. 3, the conduit adapter 52 is of the same structure as the sewage line 36 described above. The conduit adapter 52 is a substantially Y-shaped, hollow, tubular member having a diameter only slightly larger than that of the valve 100 to permit the valve 100 to be insertable therein without any gaps between the wall 114 of the valve body 112 and the interior of the conduit adapter 52. The conduit adapter 52 includes a cylindrical adapter body 54 having an open first end 54a, an open second end 54b securable to a first end of the sewage line 136, an inlet 64 formed within the adapter body 54 of the conduit adapter 52 defining an opening for waste to enter the conduit adapter 52, and an inlet adapter 60 extending outwardly from the inlet 64 and securable to an end of an inlet line 137 connected to a structure's interior plumbing.

The conduit adapter 52, preferably, further comprises a clean out hub 56 extending outwardly from the first end 54a of the adapter body 54, an outlet hub 58 extending outwardly from the second end 54b of the adapter body 54, and an inlet hub 62 extending outwardly from the end of the inlet adapter 60 opposite the adapter body 54. The outlet hub 58 and inlet hub 62 ensure that the ends of the sewage line 136 and the inlet line 137, respectively, can be adequately secured to the conduit adapter 52.

As shown in FIG. 4, the conduit adapter 52 is retrofitted onto the already existing sewage line 136 at a location where the structure's interior plumbing converges to a single line and meets the sewage line 136 exteriorly of the structure.

The outlet hub 58 of the conduit adapter 52 is securable by any suitable fastening means such as being matingly threaded, using an adhesive, or the like to an end of the sewage line 136 which leads to a remote location while the inlet hub 62 is securable to an end of the inlet line 137 similarly to the outlet hub 58.

In positioning the valve 100 within the conduit adapter 52, the second end 120 of the valve wall 114 is inserted into the clean out hub 56 of the conduit adapter 52 until the mouth 128 of the valve 100 is aligned with the inlet 64 of the conduit adapter 52. The size of the mouth 128 is defined by the size of the inlet 64 where the inlet adapter 60 intersects the conduit adapter 52.

As shown in FIG. 5, to ensure that the valve 100 is maintained in position within the conduit adapter 52, a clean out cap 57 is can be secured to the clean out hub 56. Preferably, the clean out cap 57 is threadably mounted to the clean out hub 56. Where an optional shaft 124 is included for purposes of providing purging capabilities to the sewage line 136, as described above with respect to the shaft 24 in the first embodiment, the clean out cap 57 includes a central opening 59 having a diameter of at least as wide as the shaft 124 to permit the shaft 124 to extend through the central opening 59 of the clean out cap 57.

In order to rotate the valve body 112 within the conduit adapter 52, thereby closing off the passage of waste through the sewage line 136, the valve body 112 is rotated in the same manner as described above with respect to the first embodiment by operating the means for rotating 115. Preferably, the means for rotating 115 comprises a valve handle 134.

As shown in FIG. 5, the valve 100, preferably, further comprises a secondary valve 44, such as a check valve, quarter-turn valve, or the like, in order to open and close the shaft 124 to prevent backflow from the valve body 112. The secondary valve 44 is either disposed within the shaft 124 itself or securable to the nub 126 by securing to the threaded nub 126 or any other suitable means. As shown in FIG. 5, the secondary valve 44 is secured to nub 26 of the shaft 24.

Here, the secondary valve 44 includes a secondary valve handle 46 to facilitate operation of the secondary valve 44 between open and closed positions, an injection terminal 48 for securing means for purging 170, and an injection terminal cap 50 to seal the injection terminal 48 when the means for purging 170 is not in use.

To purge the sewage line 136 of a clog while utilizing the secondary valve 44, the inlet 64 is first closed by rotating the valve handle 134 to the closed position, thereby rotating the valve body 112 and closing off the inlet line 42 from the sewage line 136. Where there is a substantial amount of waste proximate the inlet 64, the lip 132 of the valve 100 is able to cut through the waste and clear a path to facilitate rotation therein.

Once the valve body 112 has been rotated to close off the inlet line 42, the injection terminal cap 50 is removed from the secondary valve 44, exposing the injection terminal 48, and the means for purging 170 is attached to the injection terminal 48. The secondary valve handle 48 is then rotated in order to open the secondary valve 44 and the means for purging 170 releases a pressurized fluid, such as air or water, into the valve body 112 and sewage line 136. Due to the inlet line 42 being closed off by the wall 114 of the valve body 112 and the pressurized fluid being forced to flow in only one direction through the valve 100, substantial pressure builds up within the sewage line 136. In time, the pressurized fluid works its way through the sewage line 136 pushing out the clogged waste.

After the sewage line 136 is sufficiently purged of any and all clogs, the secondary valve handle 134 is rotated in the opposite direction to close the secondary valve 44, the means for purging 170 is removed from the injection terminal 48, the injection terminal cap 50 is reattached, and the valve handle 112 is returned to its open position, thus rotating the mouth 128 of the valve 100 back towards the inlet 64 and reopening passage between the inlet adapter 60 and the adapter body 54.

From the above, it is to be appreciated that defined herein is a new and unique valve that prevents backflow of waste into a structure by manually closing off a sewage line while providing simultaneous means for purging the closed off sewage line.

Having thus described the invention, what is claimed is:

1. A sewage line valve, comprising:
    (a) a rotatable valve body insertable into a clean out port of a sewage line, the valve body including a cylindrical wall having an at least substantially closed first end and an open second end, the wall defining an open interior within the valve body;
    (b) a mouth formed in the wall of the valve body providing an opening into the interior of the valve body, the mouth corresponding to the size of an inlet of the sewage line; the mouth having and edge, the edge terminating at a sharpened lip for cutting waste flowing therepast;
    (c) means for rotating the valve body between an open and a closed position; and
    wherein the mouth of the valve body aligns with an inlet of the sewage line when in the open position and, when in the closed position, the mouth of the valve body does not align with the inlet of the sewage line.

2. The valve of claim 1 wherein the edge is a tapered edge angled inwardly towards the interior of the valve body, the sharpened lip being provided at the terminus of the edge.

3. The valve of claim 1 further comprising:
    (a) a circumferential groove formed within the wall of the valve body about the mouth; and
    (b) means for sealing disposed within the groove to provide a seal between the mouth of the valve body and the sewage line.

4. The valve of claim 3 wherein the means for sealing is an O-ring.

5. The valve of claim 1 further comprising:
    a hollow shaft extending from the first end of the valve body and in fluid communication therewith, the shaft including a threaded nub opposite the valve body for attaching means for purging the sewage line.

6. The valve of claim 5 further comprising:
    (a) a secondary valve disposed on the threaded nub of the shaft for opening and closing the shaft; and
    (b) a secondary valve handle for opening and closing the secondary valve.

7. The valve of claim 6 wherein the secondary valve is selected from the group consisting of a check valve and a quarter-turn valve.

8. The valve of claim 5 further comprising:
    a shaft cap threadably mounted to the threaded nub of the shaft for sealing the shaft when the means for purging is not attached.

9. The valve of claim 1 wherein the means for rotating is an elongated handle.

10. The valve of claim 5 wherein the means for rotating is secured to the shaft.

11. A sewage line valve assembly, comprising:
    (a) a valve including:

(1) a rotatable valve body including a cylindrical wall having an at least substantially closed first end and an open second end, the wall defining an open interior within the valve body;

(2) a mouth formed in the wall of the valve body providing an opening into the interior of the valve body the mouth corresponding to the size of an inlet of the sewage line; the mouth having an edge, the edge terminating at a sharpened lip for cutting waste flowing therepast;

(b) a substantially Y-shaped conduit adapter for securing the valve to a sewage line, the conduit adapter including:

(1) a cylindrical adapter body having an open first end and an open second end, the second end being securable to an end of the sewage line, the adapter body defining an open interior, the adapter body including an inlet formed within the adapter body corresponding to the size of the mouth in the valve;

(2) an inlet adapter extending outwardly from the inlet formed in the adapter body, the inlet adapter being securable to an end of an inlet line of a structure;

(c) means for rotating the valve body between an open and a closed position; and wherein the valve is slidably insertable into the first end of the conduit adapter; and further wherein the mouth of the valve body aligns with the inlet of the conduit adapter when in the open position and, when in the closed position, the mouth of the valve body does not align with the inlet of the conduit adapter.

12. The valve assembly of claim 11 further comprising:
(a) a threaded clean out hub extending from the first end of the adapter body; and
(b) a clean out hub cap securable to the clean out hub for securing the valve within the conduit adapter.

13. The valve assembly of claim 11 further comprising:
an outlet hub extending from the second end of the adapter body for securing the adapter body to the end of the sewage line.

14. The valve assembly of claim 11 further comprising:
an inlet hub extending from the inlet adapter, the inlet hub securable to the end of the inlet line.

15. The valve assembly of claim 11 wherein the mouth further comprises:
a tapered edge angled inwardly towards the interior of the valve body, the edge terminating at a sharpened lip.

16. The valve assembly of claim 11 further comprising:
(a) a circumferential groove formed within the wall of the valve body about the mouth; and
(b) means for sealing disposed within the groove to provide a seal between the mouth of the valve body and the inlet of the conduit adapter.

17. The valve assembly of claim 11 further comprising:
a hollow shaft extending from the first end of the valve body and in fluid communication therewith, the shaft including a threaded nub opposite the valve body for attaching means for purging the sewage line.

18. The valve assembly of claim 17 further comprising:
(a) a secondary valve disposed on the threaded nub of the shaft for opening and closing the shaft; and
(b) a secondary valve handle for opening and closing the secondary valve.

19. The valve assembly of claim 17 further comprising:
a shaft cap threadably mounted to the threaded nub of the shaft for sealing the shaft when the means for purging is not attached.

20. The valve assembly of claim 11 wherein the means for rotating is an elongated handle.

* * * * *